(12) United States Patent
Sano et al.

(10) Patent No.: US 9,188,144 B2
(45) Date of Patent: Nov. 17, 2015

(54) PLASTIC BLIND RIVET

(75) Inventors: Takahiro Sano, Toyohashi (JP); Shinji Nakata, Toyohashi (JP)

(73) Assignee: NEWFREY LLC, Newark, DE (US)

( * ) Notice: Subject to any disclaimer, the term of this patent is extended or adjusted under 35 U.S.C. 154(b) by 922 days.

(21) Appl. No.: 12/889,606

(22) Filed: Sep. 24, 2010

(65) Prior Publication Data

US 2011/0076114 A1 Mar. 31, 2011

(30) Foreign Application Priority Data

Sep. 25, 2009 (JP) ................. 2009-221183

(51) Int. Cl.
*F16B 19/10* (2006.01)
*F16B 13/06* (2006.01)

(52) U.S. Cl.
CPC ........... *F16B 19/1045* (2013.01); *F16B 13/061* (2013.01)

(58) Field of Classification Search
USPC .................. 411/34, 38, 43, 45, 46, 47, 48
See application file for complete search history.

(56) References Cited

U.S. PATENT DOCUMENTS

| | | | | |
|---|---|---|---|---|
| 2,466,811 A | * | 4/1949 | Huck | 29/509 |
| 3,230,818 A | * | 1/1966 | Siebol | 411/34 |
| 3,789,728 A | * | 2/1974 | Shackelford | 411/34 |
| 4,230,017 A | * | 10/1980 | Angelosanto | 411/34 |
| 4,312,613 A | * | 1/1982 | Binns | 411/34 |
| 4,432,679 A | * | 2/1984 | Angelosanto et al. | 411/34 |
| 4,556,351 A | | 12/1985 | Wollar | |
| 4,627,775 A | * | 12/1986 | Dixon | 411/34 |
| 4,639,175 A | * | 1/1987 | Wollar | 411/38 |
| 4,907,922 A | * | 3/1990 | Jeal et al. | 411/43 |
| 5,846,039 A | | 12/1998 | Kirchen | |
| 6,213,699 B1 | * | 4/2001 | Sadri et al. | 411/43 |
| 7,156,598 B2 | * | 1/2007 | Tibbenham et al. | 411/82 |

FOREIGN PATENT DOCUMENTS

| | | |
|---|---|---|
| DE | 20020969 U | 7/2001 |
| GB | 2060110 A | 4/1981 |
| GB | 2034849 A | 5/1983 |
| JP | 55-065710 A | 5/1980 |
| JP | 61-013012 A | 1/1986 |
| JP | 2009041699 A | 2/2009 |
| WO | 02101248 A | 12/2002 |

* cited by examiner

*Primary Examiner* — Flemming Saether
(74) *Attorney, Agent, or Firm* — Kofi Schulterbrandt; Michael P. Leary

(57) ABSTRACT

A plastic blind rivet includes a sleeve with a plurality of legs formed by a plurality of slits of constant width. A body lock is formed on the inside of the rivet sleeve, and a mandrel lock is formed in the shank of the mandrel. When the rivet is set, the body lock and mandrel lock are engaged so as to maintain the legs in an expanded condition. A stopper is formed in the mandrel shank and abutments formed in the sleeve body. During rivet setting, the stopper and abutments engage to limit further deformation of the sleeve legs.

15 Claims, 5 Drawing Sheets

PLASTIC BLIND RIVET

CROSS-REFERENCE TO RELATED APPLICATIONS

This application claims the benefit of Japanese Application No. 2009-221183, filed Sep. 25, 2009, the disclosure of which is incorporated herein by reference.

BACKGROUND OF THE INVENTION

The present invention relates to a plastic blind rivet suitable for attaching an attaching part to a member being attached to, such as a panel.

A blind rivet is comprised of a rivet body comprising a hollow tubular sleeve and, at one end of that sleeve, a hollow flange formed so as to have a large diameter, and a mandrel that passes through the rivet body to extend out from the flange and that has a head, of larger diameter than the inner diameter of the sleeve, at the end of the sleeve that is opposite the flange. To fasten the blind rivet, the rivet body, having the mandrel passed through it, is inserted, mandrel head first, into an attachment hole in an attaching part that has been placed on a member being attached to, so as to line up with its attachment hole until the mandrel head protrudes from the back side of the member being attached to, and the sleeve flange is flush against the attaching part. Next, using a fastening tool, the mandrel portion extending out from the flange on the attaching part side is pulled out from (relative to) the flange with such force that it breaks. As a consequence of that pulling out, the portion of the sleeve on the back side of the member being attached to is expanded; whereupon, the blind rivet is fastened to the member being attached to and the attaching part, with that member being attached to and that attaching part clamped between the expanded portion and the flange, so that the attaching part is coupled to the member being attached to.

The most commonly used blind rivets are made of metal, but plastic blind rivets are also known, as described in Patent Literature 1 and Patent Literature 2. Compared to a metal blind rivet, a plastic blind rivet has the advantages of being light in weight and easy to machine, but, on the other hand, suffers such disadvantages as that when the sleeve of the rivet body expands, it is not easy to achieve the expansion deformation at the desired position without the sleeve breaking, and it is not easy to obtain a fastening of the desired strength. Also, in cases of plastic deformation that exceeds the limitations of the plastic material, there is a danger of problems such as cracks* occurring. To prevent cracks, plastic materials exhibiting good elongation (such as Nylon) are selected. With Nylon or the like, however, the elongation performance during drying becomes poorer than the performance when water (humidity) is being supplied. For that reason, it is necessary to continually supply water (humidity) in order to maintain constant elongation performance, which results in increased cost, and, in addition, the fastening force thereof will be affected by such environmental factors as humidity and so does not stabilize.

Prior art literature includes: Patent Literature 1, TOKKAI [Unexamined Patent Application] No. S55-065710/1980; and Patent Literature 2, TOKKAI No. S61-013012/1986. With the plastic blind rivets described in Patent Literature 1 and Patent Literature 2, latching grooves (or latching projections) are formed in multiple stages in the axial direction of the outer circumferential surface portion of the mandrel corresponding to the sleeve thereof, and latching projections (or latching grooves) are formed in multiple stages in the axial direction on the corresponding inner wall surfaces, thus making provision so that the expansion deformation can be maintained at the desired position when the sleeve of the rivet body expands. However, the formation of latching grooves and latching projections in multiple stages in the axial direction on the outer circum-ferential surface of the mandrel and inner wall surfaces of the sleeve involves complex molding, and machining is no longer easy.

In the plastic blind rivets described in Patent Literature 1 and Patent Literature 2, furthermore, there are slits that extend in the longitudinal direction of the sleeve, formed to facilitate sleeve expansion; however, in order to effect expansion at the desired position, the slits are not formed with constant widths along their entire length, but rather are formed so that some portions thereof, in the longitudinal direction, are of different width than other portions. When the slits in the sleeve are not formed with constant widths, however, molding becomes complex, and machining is no longer easy.

BRIEF SUMMARY

Therefore, an object of the present invention is to provide a plastic blind rivet whereby, even using a plastic material requiring no humidity supplying operation, the sleeve will expand at the desired position, and that expansion can be maintained without the necessity of multiple stages of latching grooves and latching projections in the mandrel and sleeve, and whereby the slits in the sleeve may be of constant width.

In order to attain that object, the plastic blind rivet relating to the present invention is one comprising: a plastic rivet body that comprises a hollow sleeve and a hollow flange formed at one end of that sleeve so as to have a diameter larger than that sleeve; and a plastic mandrel comprising a shank that passes through the rivet body and extends out from the flange, and a head of larger diameter than the inner diameter of the sleeve, disposed adjacent to the end of the sleeve that is opposite the flange and formed integrally with the shank; whereupon, a portion of the sleeve of the rivet body that is passed through attachment holes in a member being attached to and an attaching part is expanded, and the member being attached to and the attaching part are clamped between that expanded portion and the flange and are fastened together so as to be mutually coupled; wherein: in the sleeve, slits of a constant width are formed in a plurality in the circumferential direction of that sleeve, extending in the longitudinal direction of the sleeve from the end adjacent to the sleeve to a position near the other end that is adjacent to the head, and a plurality of legs is formed in that sleeve portion; the legs can be flexed so as to expand outward in the radial direction at an intermediate position therein, by a pressing force acting from the head to the other end of the sleeve when a pulling-out force is applied, by a pulling-out operation to the shank, relative to the flange; on the inside of the rivet body, body locks are formed for maintaining the expanded condition of the legs, at a position near the flange; in the shank, a mandrel lock is formed for maintaining the expanded condition of the legs; the mandrel lock being fashioned so as to latch with the body locks and maintain the expanded condition of the legs; in the shank, a stopper is formed, closer to the head than the mandrel lock, for the purpose of stopping the pulling-out operation on the shank so as to restrict excessive flexing when the legs expand; in the body locks, abutments are formed for abutting against the stopper so as to restrict excessive flexing when the legs expand; and in the shank, a breakable point of small diameter is formed at a position adjacent to the mandrel lock, at the mandrel end opposite the head, which will break by the pulling-out operation on the shank after the stopper has abutted against the abutments; whereupon, the portion of the shank coming out from the flange can be removed by breaking it at the breakable point.

As described above, the legs of the sleeve that is divided by slits are formed so that their widths are constant along its entire length and, as a consequence, can flex so as to expand at any position in the longitudinal direction, whereupon the leg portions will begin to flex about points positioned at substantially half the length from the leg ends on the mandrel head end to the leg portions adjacent to the back side of the member being attached to; in this way, the linear length of the legs in the expanded condition will be the same as the length extending from the side on which is the member being attached to out to the rivet body tip end. The expanded condition can then be stabilized, and the fastening force of the expanded portion can be increased and stabilized. When leg portions in which a plurality of slits is formed are molded in metal die, sliding in the die is rendered unnecessary. The expanded condition of the leg portions of the sleeve is maintained by the latching between the body locks of the rivet body and the mandrel lock of the mandrel; consequently, multiple stages of latching grooves and latching projections are rendered unnecessary. A stopper is formed in the shank to stop the pulling-out operation on the shank so as to restrict excessive flexure of the legs during expansion. In the body locks, abutments are formed for abutting the stopper in order to restrict excessive flexure in the legs during expansion, so that plastic deformation is possible in the leg portions of the sleeve during expansion deformation; but the development of cracks can be prevented, so there is no need to use a plastic material such as Nylon which requires a humidity supplying operation, so that polyoxymethylene (POM: polyacetal), for example, can be used. Accordingly, even using a plastic material requiring no humidity supplying operation, a plastic blind rivet can be provided which does not require multiple stages of latching grooves and latching projections in the mandrel and sleeve, whereby the sleeve will expand at the desired position and that expansion can be maintained, and wherein the slits in the sleeve may be of constant width.

In the plastic blind rivet described in the foregoing, the stopper and the body lock abutments are formed at positions at which, after the leg portions are flexed in order to expand, from the intermediate positions by the pulling-out operation, they stop the pulling out at a position that will prevent cracks from developing in the leg portions by flexing at the expanded portions. Also, the body locks and mandrel lock are formed at positions at which they will cause the leg portions of the sleeve 5 to flex and plastically deform in order to expand from the intermediate positions by the pulling-out operation, but also prevent cracks from developing due to the leg portions being flexed in the expanded portions. Consequently, cracks can be prevented from occurring in the rivet body.

In the plastic blind rivet described in the foregoing, furthermore, the sleeve portion between the head and the ends of the slits that are nearer to the head is formed as a ring-shaped portion that is continuous in the circumferential direction that receives the pressing force from the head. In the inner wall surfaces of this ring-shaped portion, a narrow groove that is indented outwardly in the radial direction is formed in the longitudinal direction between the portion where the slits terminate to the end adjacent to the head. Consequently, stress in the direction of elongation is relaxed, and crack prevention is made even more effective. Also, the step portions between the groove and the inner wall surfaces of the sleeve should preferably be formed as curved surfaces by a round shape, making crack prevention even more effective.

DETAILED DESCRIPTION OF THE PREFERRED EMBODIMENTS

Figure 9:
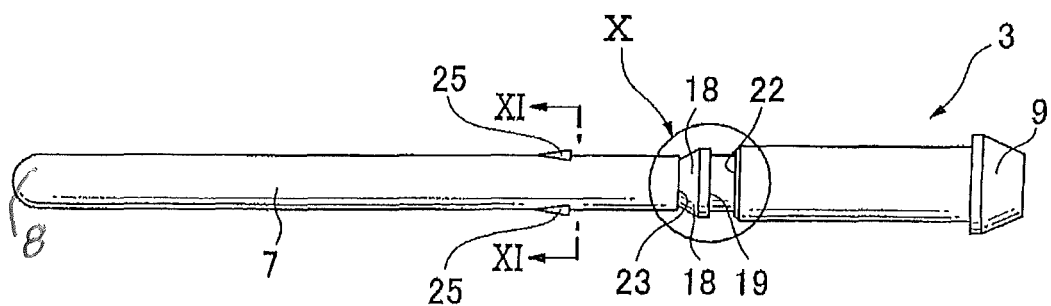
FIG. 9 is a front elevation of the mandrel of the blind rivet diagrammed in FIG. 1.
Figure 10:
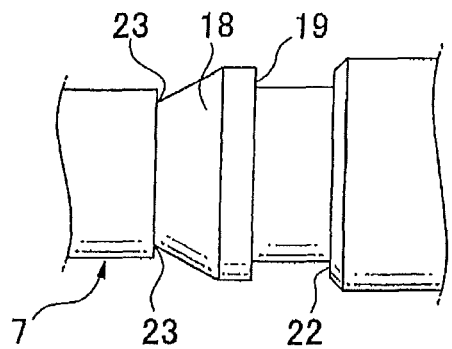
FIG. 10 is an enlarged view of the portion in circle X of the mandrel diagrammed in FIG. 9.
Figure 11:
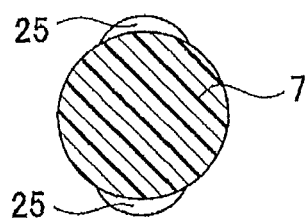
FIG. 11 is a section of the mandrel diagrammed in FIG. 9 at the XI-XI line.
Figure 12:
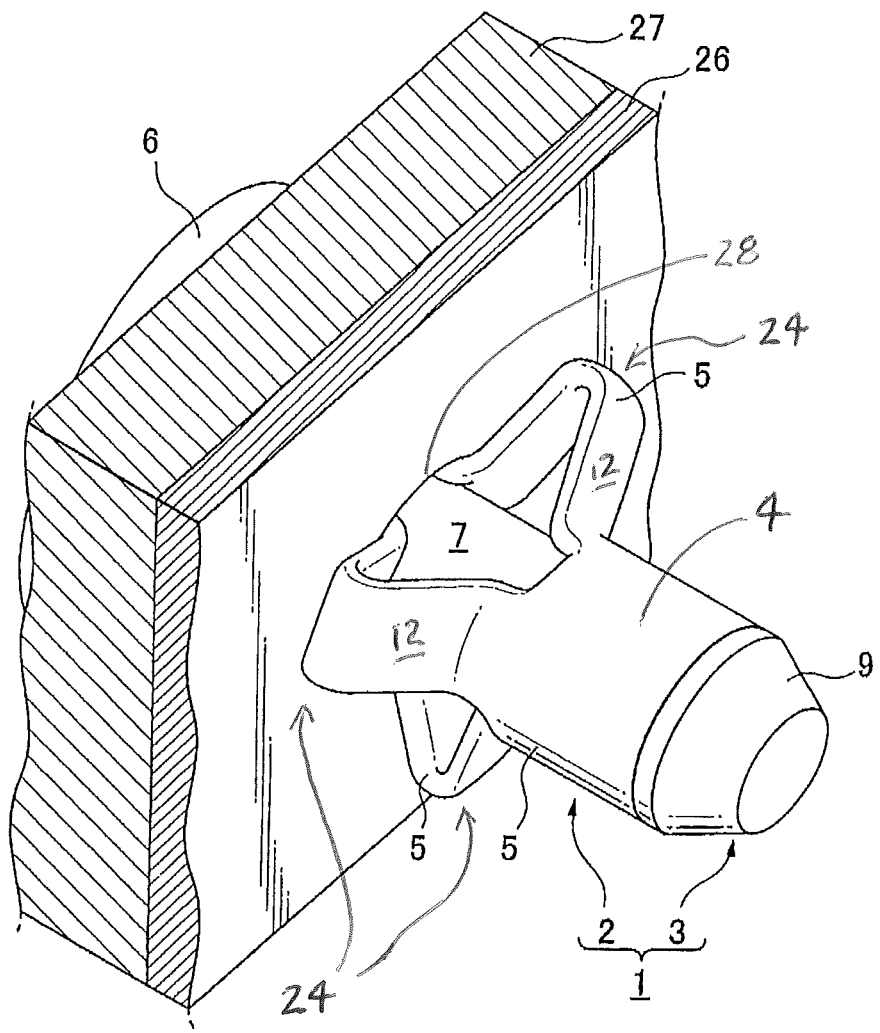
FIG. 12 is a diagram representing the condition of the blind rivet diagrammed in FIG. 1 after fastening.

A plastic blind rivet 1 relating to one embodiment of the present invention shall now be described with reference to the drawings. In FIGS. 1 to 6, the plastic blind rivet 1 is diagrammed. In FIGS. 7 and 8, a rivet body 2 that is one component of the plastic blind rivet 1 is diagrammed. In FIGS. 9 to 11, a mandrel 3 that is another component of the plastic blind rivet 1 is diagrammed. In FIG. 12, the plastic blind rivet 1 is diagrammed in the condition thereof after fastening. In the following descriptions, moreover, the plastic blind rivet 1 will sometimes be called simply the blind rivet 1. For the plastic material of the rivet body 2 and mandrel 3, in this embodiment, polyoxymethylene (POM: polyacetal) is used instead of a material that exhibits relatively more elongation, such as Nylon. For that reason, no moisture (humidity) supplying operation, such as is required with Nylon or the like, is required at all, and the fastening force is not affected by environmental changes such as changes in humidity.

As diagrammed in FIGS. 1 to 11, the blind rivet 1 comprises a rivet body 2 made of plastic (such as POM), and a mandrel 3 made of plastic (such as POM) that is a separate component from the rivet body 2. The rivet body 2 comprises a hollow tubular sleeve 5, and a hollow flange 6 formed at one end of the sleeve 5 with a diameter that is larger than the outer diameter of the sleeve 5. The mandrel 3 has a shank 7 that passes through the rivet body 2, of such length as to extend out from the flange 6, and a head 9 that is formed with a diameter larger than the inner diameter of the sleeve 5, disposed adjacent to the sleeve end opposite the flange 6.

The rivet body 2 shall now be described with reference to FIGS. 1 to 8. In the sleeve 5 of the rivet body 2, a plural number of slits 10 (being three (3) in number in the example diagrammed), for forming flexible legs 12 so that the rivet body 2 can expand, is formed in the longitudinal direction between the flange 6 and the end 4 adjacent the mandrel head 9 (that is, the tip end of 4 the rivet body 2). In the present invention, the slits 10 are formed so that their widths are constant over their entire lengths (such width being set so that the leg portions 12 of the sleeve 5 that is divided by the slits 10 can be flexed in an expanding direction, without impairing the strength of those legs), as diagrammed in FIGS. 1, 7, and 8. Consequently, the leg portions 12 of the sleeve 5 divided by the slits 10 can flex so as to expand at every position along the length thereof. Furthermore, when a buckling load is applied to the sleeve 5 by the mandrel 3 being forcefully pulled in, the leg portions 12 divided by the slits 10 will begin to flex about points that are at positions that are at substantially half the length thereof between the leg ends on the mandrel head 9 end and the portions of the legs adjacent to the back side of the member being attached to 26 (that is, at intermediate positions); consequently, the linear lengths of the legs 12 in the expanded condition will be the same on the side where the member being attached to 26 is and on the rivet body tip 4 side; whereupon, a stabilized expanded condition and a high and stable fastening force can be realized. Also, the slits 10 can be formed in narrow shapes of constant width, and all the slits 10 can be formed in the same shape; consequently, sliding will no longer be required in the die when die-molding the leg portions 12 formed by the three slits 10. In contrast thereto, when slits of different widths in the longitudinal direction are formed, as in the known rivet bodies described in Patent Literature 1 and Patent Literature 2, sliding is necessary in the die. Furthermore, when slits of different widths in the longitudinal direction are formed, as in the rivet bodies described in Patent Literature 1 and Patent Literature 2, the points of flexure when the leg portions divided by the slits expand will be at fixed positions where the strength of the legs is weakest (that is, where the leg widths are the smallest). However, in cases where the sheet thickness of the member being attached to or of the attaching part is not constant, the linear lengths of the legs in the expanded condition will sometimes differ between the side the member being attached to is on and the rivet body tip side; thus, the expanded condition will be unstable, so that a stabilized high fastening force will not always be realized. Such problems are eliminated in the blind rivet 1 relating to the present invention.

Figure 6:
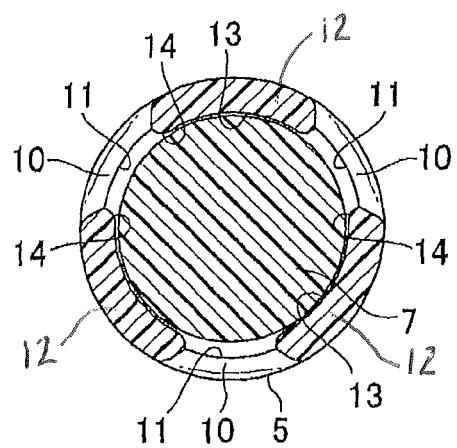
FIG. 6 is a section of the blind rivet diagrammed in FIG. 1 at the IV-IV line.
Figure 7:
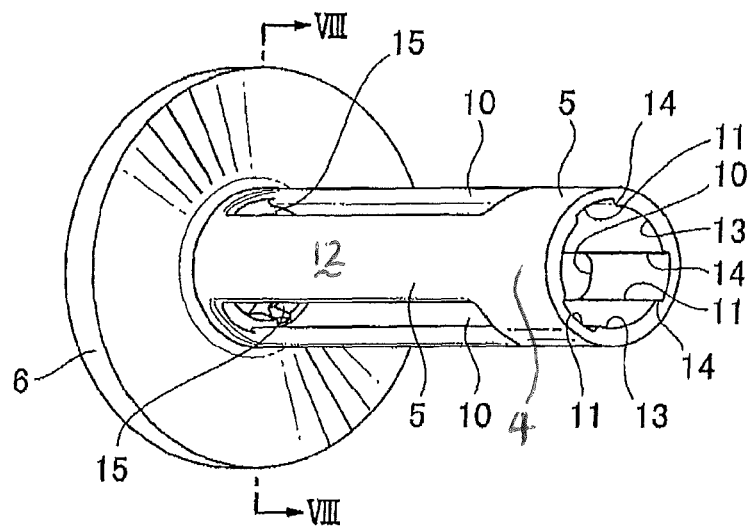
FIG. 7 is a diagonal view of the rivet body of the blind rivet diagrammed in FIG. 1.
Figure 8:
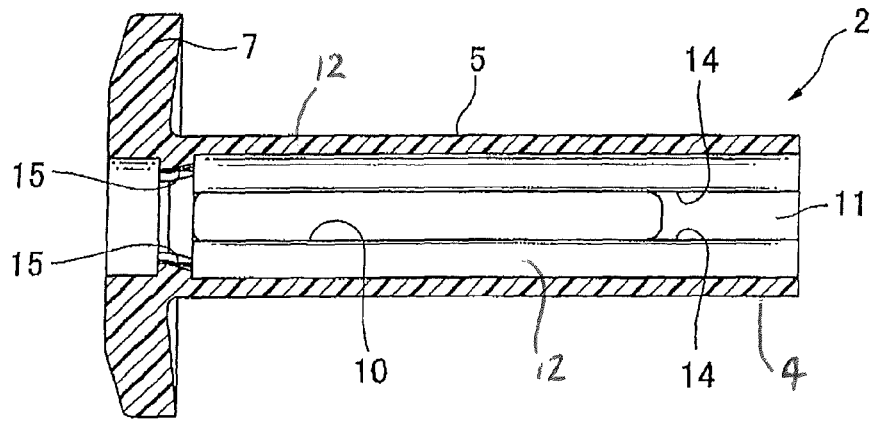
FIG. 8 is a section of the clamp diagrammed in FIG. 7 at the VIII-VIII line.

As diagrammed in FIGS. 6, 7 and 8, the tip end portion 4 of the sleeve 5 between the head 9 and the end of the slits 10 closer to the head 9 is formed as a ring-shaped portion 4 that is continuous in the circumferential direction and which receives the pressing force from the head 9 to the slits 10. In the inner wall surfaces 13 of the portion of the sleeve 5 toward the tip end 4 of the rivet body 2, in the longitudinal direction of the ring-shaped portion 4 (the portion of the sleeve 5 between the portion where the slits 10 terminate and the tip end thereof adjacent to the mandrel head 9 (that is, the tip end 4 of the rivet body 2)), there is formed a narrow groove 11 that is indented outwardly in the radial direction. By this groove 11, the stresses applied at the time of the flex deformation when the sleeve 5 expands (particularly the stress occurring in the direction of elongation) can be relaxed, which is effective in preventing cracks. The step portions 14, between the groove 11 and the inner wall surfaces 13 of the sleeve 5, are formed as R surfaces (curved convex surfaces of radius R). Because of the step portion 14 wherein the R surfaces of the groove 11 are formed, the stresses applied at the time of flex deformation when the sleeve 5 expands (particularly the stress occurring the direction of elongation) can be relaxed even more, which further contributes to the prevention of cracks. Similarly, the R-surface shape of the step portion 14 should preferably be formed also in the corner portions of the legs 12.

Figure 4:
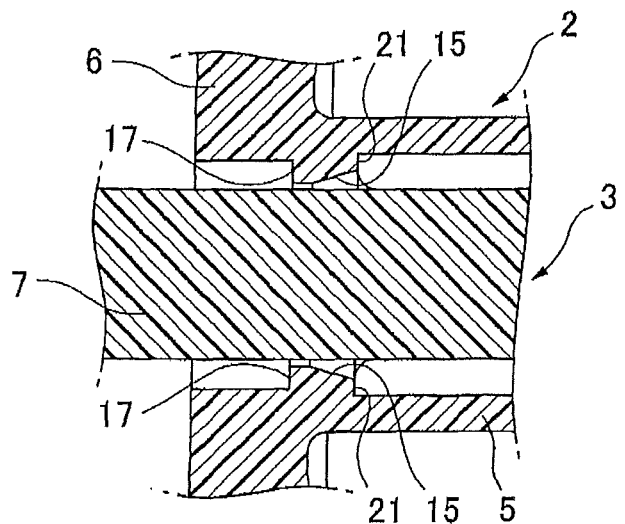
FIG. 4 is an enlarged view of the portion in circle IV of the blind rivet diagrammed in FIG. 3.
Figure 5:
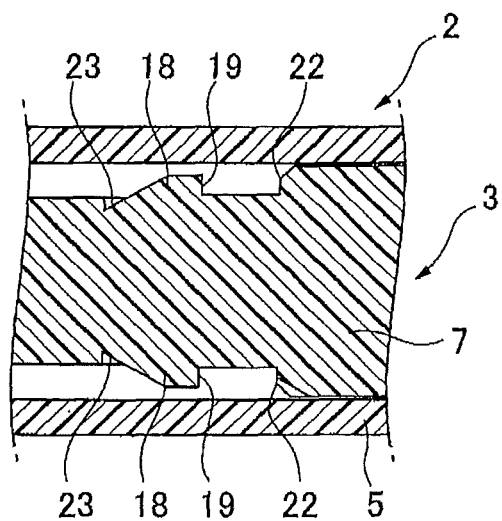
FIG. 5 is an enlarged view of the portion in circle V of the blind rivet diagrammed in FIG. 3.

Referring now to FIGS. 4 and 5, in the rivet body 2, either inside the flange 6 or inside the portion of the sleeve adjacent to the flange 6, body locks 15 are formed for latching with a mandrel lock 18 formed in the shank 7 of the mandrel 3. The body locks 15 latch with the mandrel lock 18 formed in the shank 7 of the mandrel 3 and maintain the expanded condition of the sleeve 5 of the rivet body 2. The body locks 15, moreover, can be formed at any position and in any number. In this embodiment, three such locks are formed, matching the three leg portions 12 at positions near the terminal ends on the flange 6 side of those leg portions. Each of these body locks 15, as best shown in FIG. 4, are sloped toward the inside in the radial direction, from the tip end 4 of the rivet body 2 toward the flange 6, being formed so as to form latching shoulders 17 on the flange 6 side. In each of the body locks 15 at the end opposite the latching shoulders 17 (that is, the end facing toward the tip end 4 of the rivet body 2), an abutment 21 is formed for abutting a stopper 22 formed in the shank 7 of the mandrel 3.

Figure 1:
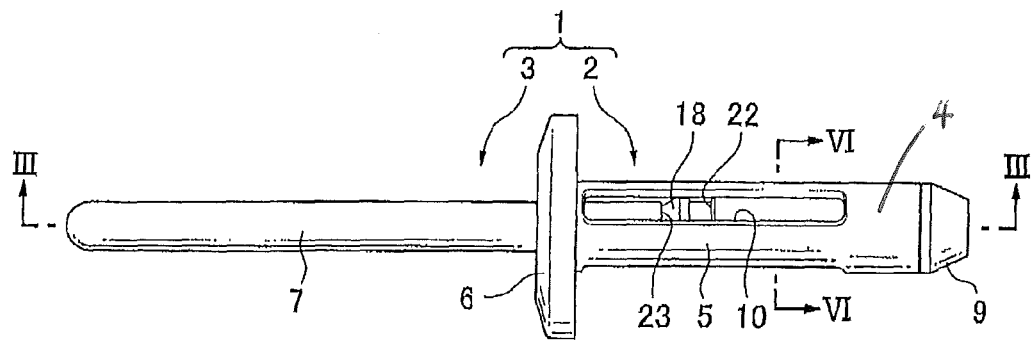
FIG. 1 is a front elevation of a plastic blind rivet relating to one embodiment of the present invention.
Figure 2:
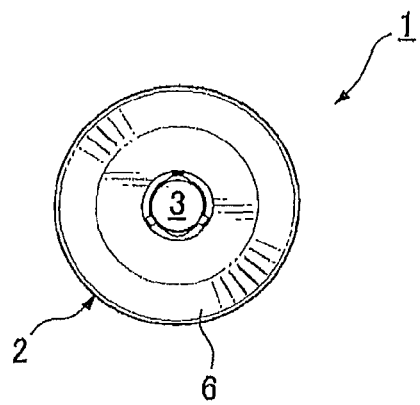
FIG. 2 is a left side elevation of the blind rivet diagrammed in FIG. 1.
Figure 3:
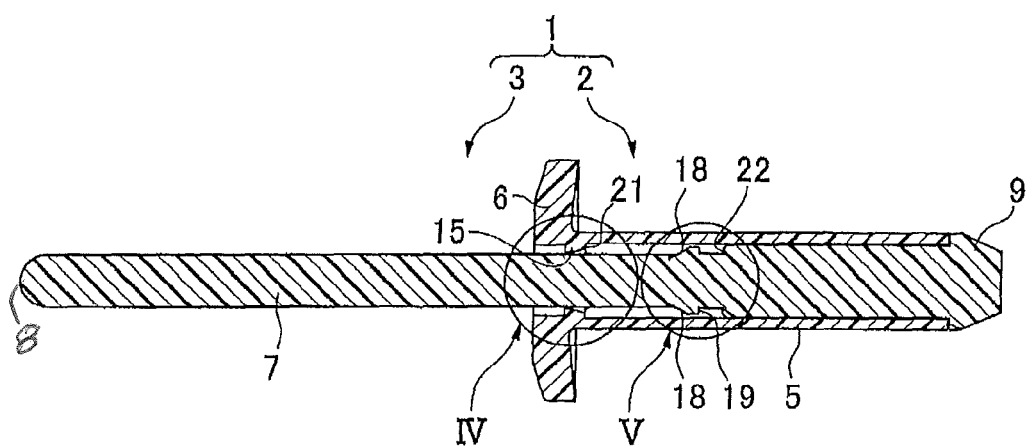
FIG. 3 is a section of the blind rivet diagrammed in FIG. 1 at the III-III line.

The mandrel 3 shall now be described with reference to FIGS. 1 to 6 and FIGS. 9 to 11. The mandrel 3 has a shank 7 that passes through the sleeve 5 of the rivet body 2 and extends out from the flange 6, and a head 9, formed with a diameter larger than the inner diameter of the sleeve 5, disposed adjacent to the tip end 4 of the sleeve that is opposite the flange 6 of the rivet body 2 (that is, at the tip end 4 of the rivet body 2). The shank 7 has an outer diameter that is smaller than the inner diameter of the sleeve 5 in order to pass through the sleeve 5. The head 9, as diagrammed in FIGS. 1 and 3, is formed with an outer diameter that is substantially the same as the outer diameter of the sleeve 5 and formed so that when the shank 7 of the mandrel 3 is pulled in, on the left side in FIGS. 1 and 3, the end of the sleeve 5 is definitely pressed to the left side. The shank 7 of the mandrel 3, as diagrammed in FIGS. 1 and 3, extends out on the left side from the flange 6 of the rivet body 2; that protruding portion of shank 7 is grasped by a fastening tool (not shown), and the mandrel 3 is forcefully pulled out from the rivet body 2 by the fastening tool, the head 9 then forcefully presses against the ring end 4 of the sleeve 5, imparting a buckling force to the sleeve 5, and the leg portions 12 are flexed so as to expand at approximately midpoints thereof. The head 9 is formed with a taper in order to be easily inserted into prepared holes 28 in the attaching part 27 and in the member being attached to 26. In the shank 7 of the mandrel 3, in the intermediate portion inserted into the sleeve 5, the mandrel lock 18 is formed. The mandrel lock 18 latches with the body locks 15 formed in the rivet body 2 when the leg portions 12 of the sleeve 5 flex so as to expand and strongly clamp the member being attached to 26 and the attaching part 27 between the expanded portion 24 and the flange 6, and maintaining the expanded condition of the sleeve 5. The mandrel lock 18 is formed in a shape capable of stably latching with the body locks 15, and at a position capable of maintaining the leg portions 12 of the sleeve 5 in a fixed expanded condition 24. As diagrammed in FIGS. 3, 5, 9 and 10, the mandrel lock 18 is formed in order to slope outwardly in the radial direction from the portion on the sleeve 5 side toward the head 9, and to form a latching shoulder 19 on the head 9 side. The mandrel lock 18 and body locks 15, moreover, cause the leg portions 12 of the sleeve 5 to flex and undergo plastic deformation by the pulling-out operation, but they are formed at positions where the development of cracks due to the flexing of the leg portions at the expanded portion is prevented.

In the mandrel shank 7, a stopper 22 is formed at a position separated a certain distance from the mandrel lock 18 toward the head 9; here a latching shoulder or stopper 22 is formed that abuts abutments 21 of the body locks 15 of the rivet body 2. The stopper 22 stops any pulling out of the shank 7 from the rivet body 2 beyond that position in order to prevent the development of cracks due to the flexing of the expanded leg portions 12, after the mandrel 3 has been forcefully pulled out from the rivet body 2 and the member being attached to 26 and the attaching part 27 have been strongly clamped between the expanded portion 24 and the flange 6 when the leg portions 12 of the sleeve 5 are flexed and expanded. The stopper 22 abuts the abutments 21 of the body locks 15 of the rivet body 2, and resists further pulling out of the mandrel shank 7. For that purpose, the body locks 15 have abutments 21 for abutting the stopper 22 on the mandrel head 9 side. The positions of the stopper 22 and abutments 21 are established at locations where, when the mandrel shank 7 is pulled out from the rivet body 2 and the mandrel lock 18 rides over the body locks 15, the mandrel lock 18 will latch with the body locks 15 to effect a locked condition, and the member being attached to 26 and the attaching part 27 will be strongly clamped by the flange 6 and the expanded portion 24 when the leg portions 12 of the sleeve 5 are flexed, preventing further pulling out of the shank 7.

In the mandrel shank 7, as diagrammed in FIGS. 5, 9 and 10, a breakable point 23 is formed on the mandrel tip 8 side of the mandrel lock 18 (toward the tip end 8 of the mandrel 3), with a diameter that is smaller than the diameter of the other portions of the shank 7, sloped so as to be continuous with the slope of the mandrel lock 18. The breakable point 23 will be broken by the pulling-out force on the mandrel 3 after the stopper 22 has abutted the abutments 21. Before the breakable point 23 breaks, the mandrel 3 is forcefully pulled out relative to the rivet body 2, the head 9 forcefully presses against the ring end 4 of the sleeve 5, applying a buckling force to the sleeve 5, and flexing the leg portions 12; the body locks 15 and the mandrel lock 18 then engage, and the expanded condition 24 is locked. The stopper 22, by a subsequent pulling-out force, will abut the abutments 21; due to the pulling-out force after that abutment, the portion of the shank 7 of the mandrel 3 that is on the tip 8 end side of the breakable point 23 (the left side in FIG. 9) will then be separated from the rivet body 2 and removed by the fastening tool. The force required to break the breakable point 23 is selected so that breakage can be effected with a force such that cracks will not develop in the flexed and expanded portion 24 after the member being attached to 26 and the attaching part 27 have been strongly clamped by the flange 6 and the expanded portion 24 of the sleeve 5. Moreover, as diagrammed in FIGS. 9 and 11, in the mandrel shank 7, a pair of small projections 25 should preferably be provided at positions so they will latch with the body locks 15, in order to prevent the mandrel 3, combined with the rivet body 2 to pass through it, from separating in an unexpanded (as manufactured) condition from the rivet body 2.

FIG. 12 shows how a member being attached to 26 such as a body panel is attached to the an attaching part 27 using the plastic blind rivet 1 comprising the rivet body 2 and the mandrel 3. In the attachment operation for the plastic blind rivet 1, the sleeve 5 of the rivet body 2 is passed through an attachment hole in the attaching part 27 that is lined up on an attachment hole 28 in the member being attached to 26, and the flange 6 is made to abut the attaching part 27. The tip end 8 portion of the shank 7 of the mandrel 3 that extends upward, out from the flange 6, is grasped in the jaws of a commonly known blind rivet fastening tool. The mandrel shank 7 is pulled out from both the rivet body 2 and the attaching part 27 with a powerful force by the action of the blind rivet fastening tool. By this pulling-out operation, the tip end 4 of the rivet body sleeve 5 that abuts the head 9 of the mandrel 3 is pulled toward the flange 6 side with a powerful force. By this pulling-out operation, the head 9 forcefully presses against the ring end 4 of the sleeve 5, applying a buckling force to the sleeve 5, and intermediate portions of the leg portions 12 of the sleeve 5 begin to flex so as to expand. When the pulling-out operation is continued further, the mandrel lock 18 rides over the body locks 15 and the mandrel lock 18 latches with the body locks 15; the expanded condition of the sleeve leg portions 12 is then locked, and the condition whereby the member being attached to 26 and the attaching part 27 are strongly clamped by the expanded portion 24 and the flange 6 is secured. In this expanded condition, the leg portions 12 of the sleeve 5 are deformed to the point where plastic deformation occurs but are not deformed to the point where cracks develop. The stopper 22 of the shank 7 abuts the abutments 21 of the body locks 15, due to the pulling-out operation after the maintaining of the expanded condition has been secured by the latching of the mandrel lock 18 and the body locks 15, and the shank 7 of the mandrel 3 will be broken at the breakable point 23 by the pulling-out force resulting from any further pulling-out operation. Even after such breakage, however, because the stopper 22 abuts the abutments 21, further flexing of the expanded portion of the sleeve legs is prevented, and cracks in the legs are prevented from occurring. By the breaking at the breakable point 23, the portion of the mandrel 3 on the tip end 8 side (left side in FIG. 9) will separate from the rivet body 2; it can then be grasped in the jaws of the fastening tool and removed from the blind rivet 1. The expanded portion 24 of the sleeve 5 is maintained by the latching between the body locks 15 and the mandrel lock 18; the member being attached to 26 and the attaching part 27 are then clamped between the expanded portion 24 and the flange 6, and the attaching part 27 is joined to the member being attached to 26.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A blind rivet for coupling a first workpiece to a second workpiece, the rivet comprising:
    a plastic rivet body that includes a hollow sleeve of a first diameter, and a hollow flange formed at a first end of the sleeve, the flange having a second diameter larger than the first diameter of the sleeve;
    a plastic mandrel that includes a shank mounted within the rivet body and extending out from the flange, and a head formed integrally with the shank, the head of a third diameter larger than an inner diameter of the sleeve, the head disposed adjacent to a second end of the sleeve that is opposite the flange;
    a plurality of slits of a constant width formed in the sleeve and arranged circumferentially around sleeve and extending in the longitudinal direction of the sleeve from adjacent to the flange to a position near the second end of the sleeve that is adjacent to the head;
    a plurality of legs formed in the sleeve; the legs can be flexed in order to expand outward in the radial direction at an intermediate position therein, by a pressing force acting from the second end of the sleeve to the first end of the sleeve, when a pulling-out force is applied to move the shank relative to the flange;
    a body lock formed on an inside of the rivet body, and a mandrel lock formed in the shank, the mandrel lock is fashioned so as to be latchable with the body lock and maintain the legs in an expanded condition;

a stopper formed in the shank closer to the head than the mandrel lock; an abutment formed in the body lock and engageable with the stopper to limit the movement of the shank when the pulling-out force is applied; and a breakable point of small diameter formed in the shank at a position adjacent to the mandrel lock, the breakable point will break when the pulling-out force is applied on the shank after the stopper has engaged the abutment.

2. The blind rivet according to claim 1, wherein the stopper and the abutment of the body lock are formed at positions at which, after the legs have achieve the expanded condition by the pulling-out force, the pulling out is then stopped before the development of cracks in the legs.

3. The blind rivet according to claim 1, wherein the body lock and the mandrel lock are formed at positions at which the legs are flexed and plastically deformed by the pulling-out force, but at which the occurrence of cracks due to the flexure of the leg portions is prevented.

4. The blind rivet according to claim 1, and further including a ring shaped portion of the sleeve located between the second end of the sleeve and an end of the slits and continuous in the circumferential direction, wherein the ring shaped portion receives the pressing force from the head.

5. The blind rivet according to claim 4, wherein, a narrow groove, indented outwardly in the radial direction, is formed on an inner wall surface of the ring-shaped portion of the sleeve, the groove extending in the longitudinal direction from the slits to the end adjacent to the head.

6. The blind rivet according to claim 5, wherein a stepped portion extending radially between the groove and the inner wall surfaces of the sleeve are formed as curved surfaces.

7. The blind rivet according to claim 1, wherein the rivet body and the mandrel are made of polyoxymethylene.

8. A blind rivet operable for clamping a first workpiece to a second workpiece when the rivet is deformed by a setting force during a setting operation from an original condition to a set condition, the rivet comprising:

a rivet body formed of a plastic, the rivet body including a tubular sleeve and an annular flange, the sleeve having a first end and a second end and defining an external diameter and a bore with an inner diameter, the flange located coaxially at the first end of the sleeve and defining a flange diameter greater that the external diameter of the sleeve a mandrel formed of a plastic, the mandrel including a shank and a head, the shank having a tip end and a head end, the head formed integrally at the head end of the shank and defining a head diameter larger than the inner diameter of the sleeve bore, the shank is mounted within the bore of the sleeve with the head disposed adjacent to the second end of the sleeve;

a plurality of slits defined by the sleeve extend radially through the sleeve, the slits are of constant width and arranged circumferentially around the sleeve and extend longitudinally along the sleeve from proximate the first end to proximate the second end;

a plurality of legs formed in the sleeve alternate circumferentially with the slits around the sleeve;

a body lock formed on the inside of the rivet body, and a mandrel lock formed in the shank, the mandrel lock arranged to latch with the body lock when the rivet is in the set condition and to prevent the rivet from relaxing back toward the original condition after the setting force is removed; and a stopper for abutting the rivot body for stopping any pulling out of the shank from the rivot body.

9. The blind rivet according to claim 8, wherein the rivet body and the mandrel are made of polyoxymethylene.

10. The blind rivet according to claim 9, further comprising: a stopper formed in the mandrel shank closer to the head than the mandrel lock; an abutment formed in the body lock, the abutment engageable with the stopper to limit deformation of the legs during the setting operation.

11. The blind rivet according to claim 10, further comprising a breakable point of small diameter formed in the shank at a position adjacent to the mandrel lock, wherein the breakable point will break during the setting operation after the stopper has abutted the abutment.

12. The blind rivet according to claim 11, further including a ring shaped portion of the sleeve located between the second end of the sleeve and an end of the slits proximate the mandrel head, wherein the ring shaped portion is continuous in the circumferential direction and receives the setting force from the mandrel head.

13. The blind rivet according to claim 12, further including a groove formed on an inner wall surface of the ring-shaped portion of the sleeve, the groove indented outwardly in the radial direction and extending in the longitudinal direction from the slit to the second end of the sleeve.

14. The blind rivet according to claim 13, wherein the groove is defined by a bottom radially outward wall and two opposed side walls extending from the inner wall surface to the bottom wall, and the two opposed side walls are formed as curved surfaces.

15. The blind rivet according to claim 14, wherein the curved surfaces of the two opposite side walls are convex surfaces that bow into the groove.

* * * * *